Jan. 6, 1953     C. W. JONES     2,624,588
RETRACTABLE RUNNER AND WHEELED TYPE OF GAME CARRIER
Filed Jan. 24, 1949
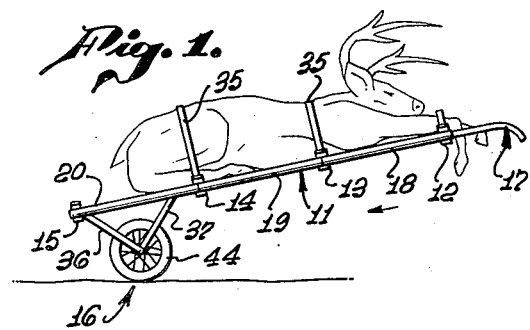
CHARLES W. JONES,
INVENTOR.
BY *H. Calvin White*
ATTORNEY.

Patented Jan. 6, 1953

2,624,588

UNITED STATES PATENT OFFICE 2,624,588

RETRACTABLE RUNNER AND WHEELED TYPE OF GAME CARRIER

Charles W. Jones, Pomona, Calif.

Application January 24, 1949, Serial No. 72,491

4 Claims. (Cl. 280—9)

This invention relates generally to light weight disjointable carts particularly adapted for game carrying purposes.

Hunters frequently find it necessary to transport relatively heavy game, such as deer, from more or less remote locations inaccessible by automobile. A major object of the present invention is to provide a novel cart for carrying game under such conditions, the cart being characterized by easy portability in a collapsed condition and being adapted for quick assembly in the field. To achieve these results, I construct the cart from a number of light weight primary units or parts all of such design as to permit their compact reception in a relatively small and easily carried case or container.

It is a further object of the invention to provide a novel dismountable ground traveling unit adapted for complete disassembly to a condition permitting compact storage. In accordance with the invention, the ground traveling unit may be designed to permit alternate use of a ground engaging wheel or a runner for travel over snow. Preferably, the runner may be either completely dismounted during wheeled travel or pivoted upwardly about a wheel carrying axle to a retracted position.

The above and further features and objects of the present invention will be better understood from the following detailed description of the typical embodiment illustrated in the accompanying drawing, in which:

Fig. 1 is a side view of the assembled cart in use;

Fig. 2 is a perspective view of the cart in substantially upright position;

Fig. 3 is an enlarged fragmentary longitudinal section through one of the frame members of the cart and taken on line 3—3 of Fig. 2;

Fig. 4 is an enlarged fragmentary transverse section taken on line 4—4 of Fig. 3;

Fig. 5 is a fragmentary side elevation of the ground traveling assembly with the runner in ground engaging position;

Fig. 6 is a fragmentary perspective of an auxiliary handle arrangement attached to the forward end of the cart; and Fig. 7 is an enlarged fragmentary view of the upper ends of the runner braces.

Referring first to Figs. 1 and 2, the illustrated cart comprises essentially a pair of rigid sectional frame members, generally indicated at 10 and 11, disposed in laterally spaced upwardly diverging relation, a number of transverse load supporting members 12, 13, 14 and 15, and a ground traveling assembly generally indicated at 16.

Each of the frame members 10 and 11 comprises an upper tubular handle section 17 and a series of longitudinally alined and interconnected tubular sections 18, 19 and 20. Handle sections 17 are curved at their upper ends 21 to facilitate handling of the cart and are of a diameter permitting reception of their lower ends within the upper ends of frame sections 18 (see Fig. 3). The interconnected ends of sections 17 and 18 have two sets of registering transverse openings corresponding to similar openings in the ends of upper load supporting member 12 and through all of which bolts 22 and 23 are passed. Wing nuts 24 and 25 are applied to the rearward ends of these bolts, respectively, and tightened to a condition rigidly retaining sections 17 and 18 and load supporting member 12 together in the illustrated relation.

At its lower end, each section 18 carries a reduced diameter tubular insert 26 preferably rigidly secured to section 18 and having a downwardly projecting end 27 telescopically receivable within the upper end of the corresponding next lower section 19. Load supporting member 13, has, at either end, a pair of openings registering with corresponding transverse openings in section 18 and 19 and insert 26 and through which wing nut-carrying bolts 28 and 29 pass to rigidly retain the various sections together and to the load supporting member. A pair of bolts 30 and 31 similarly secure each pair of sections 19 and 20 together and to load supporting member 14. A final load supporting member 15 is secured at opposite ends to the lower ends of frame sections 20 by two pairs of bolts 32 and 33.

Each of the load supporting members 12, 13, 14 and 15 is preferably of longitudinally curved configuration to effectively center the load and is provided at its ends with a pair of slots 34, through which straps 35 may be passed for securing the animal to the cart (see Fig. 1).

The ground traveling assembly is removably secured in depending centrally positioned relation to lower frame sections 20. Each section 20 carries a pair of tubular downwardly converging supports 36 and 37, secured to its lower and upper ends, respectively, by angularly disposed bolts 40 and 41 (see Fig. 5). Supports 36 and 37 have flattened lower ends 42 with registering openings through which axle 43 of wheel 44 passes to rotatably support the wheel between the two sets of supports. Nuts 45 are threadedly received at each end of axle 43 to retain the wheel in the illustrated position.

To permit use of the cart on snow, the ground traveling assembly is adapted to carry a runner 46, as seen in Fig. 5. The runner presents a pair of laterally spaced upstanding flanges 47, to each of which is removably secured by bolts 48 and 49, a pair of upwardly converging braces 50 and 57. Each of these braces has a flattened upper end 58 provided with a slot 59 (see Fig. 7) for reception of axle 43.

An auxiliary handle may be removably attachable to the lower ends of frame sections 20 to permit two persons to move the cart. For this purpose, I show in Fig. 6 a tubular handle portion 51 having a reduced diameter extension 52 secured to its forward end by bolt 53 and having a pair of transversely curved connecting members 54 secured to its rearward end by bolt 55 and to the forward or lower ends of frame sections 20 by bolts 56.

All of the parts of the cart are preferably formed of light weight material, such as aluminum, and are easily carried in a relatively small case when the cart is completely disassembled. As will be understood the wing nuts may be loosened by hand to permit removal of the various bolts for completely disjointing the cart. Further, nuts 45 may be removed from axle 43 to permit detachment of the wheel and the runner braces.

When it is desired to use the cart, the various parts are assembled in the illustrated relation, and the animal is secured by straps 35 in the manner shown in Fig. 1. The cart may then be wheeled over the ground as in Fig. 1, or moved over snow with the runner applied as in Fig. 5. The runner assembly is particularly designed to be either completely removable by merely slipping braces 50 and 57 out of engagement with the axle, or pivotable upwardly about axle 43 to a retracted position above the wheel. (See dot-dash position of Fig. 5.) If the animal is sufficiently heavy to require the cooperation of two persons in its transportation, the auxiliary forward handle shown in Fig. 6 is applied to the cart, permitting one of the persons to pull the cart while the other pushes.

I claim:

1. A disjointable light weight game carrying cart comprising a plurality of elongated sections detachably secured in two end to end series to form a pair of rigid frame members, a load supporting member detachably secured to said frame members and extending transversely therebetween to maintain said frame members in laterally spaced relation, a single wheel detachably secured to said frame members and in depending relation thereto for movably supporting the cart, and a single runner detachably carried by said frame members and pivotable between a lowered active position beneath said wheel and a raised position above said wheel.

2. A disjointable light weight game carrying cart comprising a plurality of elongated sections detachably secured in two end to end series to form a pair of rigid frame members, a load supporting member detachably secured to said frame members and extending transversely therebetween to maintain said frame members in laterally spaced relation, two pairs of elongated supports detachably secured at spaced locations to corresponding end sections of said frame members and in depending relation thereto, each support having a flattened end with a transverse opening, an axle extending through said openings to be carried by said supports, a runner for supporting said cart, a pair of braces having their corresponding first ends detachably secured to said runner and having flattened other ends with registering slots receiving said axle.

3. A disjointable light weight game carrying cart comprising a plurality of elongated sections detachably secured in two end to end series to form a pair of rigid frame members, a load supporting member detachably secured to said frame members and extending transversely therebetween to maintain said frame members in laterally spaced relation, two pairs of elongated supports detachably secured at spaced locations to corresponding end sections of said frame members and in depending relation thereto, each support having a flattened end with a transverse opening, an axle extending through said openings to be carried by said supports, a wheel carried by said axle, and a detachable runner assembly carried by said axle and pivotable about said axle between a lowered active position beneath said wheel and a raised retracted position above said wheel.

4. A disjointable light weight game carrying cart comprising a plurality of elongated tubular sections telescopically interengaged in two end to end series to form a pair of rigid laterally spaced frame members, adjacent sections having transverse openings near their engaged ends, a plurality of load supporting members extending transversely between said spaced frame members, said supporting members having ends overlying the interengaged ends of adjacent sections and having openings to register with said section openings, detachable fasteners extending through said registering openings to rigidly secure said sections together and to said load supporting members, and a ground traveling unit detachably secured to said frame members in depending centrally positioned relation thereto for movably supporting the cart.

CHARLES W. JONES.

REFERENCES CITED

The following references are of record in the file of this patent:

UNITED STATES PATENTS

| Number | Name | Date |
|---|---|---|
| 850,125 | Baldauf | Apr. 16, 1907 |
| 1,385,107 | Baier | July 19, 1921 |
| 1,576,426 | Griffin | Mar. 9, 1926 |
| 1,701,212 | Nickerson | Feb. 5, 1929 |
| 2,183,066 | Fields | Dec. 12, 1939 |
| 2,416,492 | Neeley | Feb. 25, 1947 |
| 2,464,525 | Nurney | Mar. 15, 1949 |
| 2,465,112 | Murphey | Mar. 22, 1949 |
| 2,468,390 | Binz | Apr. 26, 1949 |

FOREIGN PATENTS

| Number | Country | Date |
|---|---|---|
| 416,834 | France | Oct. 29, 1910 |